(12) United States Patent
Fujita et al.

(10) Patent No.: US 7,083,028 B2
(45) Date of Patent: Aug. 1, 2006

(54) HYDRAULIC SHOCK ABSORBER FOR VEHICLE

(75) Inventors: Nobuaki Fujita, Shizuoka (JP); Kazumi Imai, Shizuoka (JP)

(73) Assignee: Showa Corporation, Saitama (JP)

( * ) Notice: Subject to any disclaimer, the term of this patent is extended or adjusted under 35 U.S.C. 154(b) by 0 days.

(21) Appl. No.: 10/867,185

(22) Filed: Jun. 14, 2004

(65) Prior Publication Data

US 2005/0121274 A1   Jun. 9, 2005

(30) Foreign Application Priority Data

Dec. 4, 2003  (JP) .............. 2003-406530

(51) Int. Cl.
    *F16F 9/00*  (2006.01)
(52) U.S. Cl. ............... 188/321.11; 188/322.12
(58) Field of Classification Search ........... 188/321.11, 188/322.19, 322.12, 322.17, 322.16, 322.18
See application file for complete search history.

(56) References Cited

U.S. PATENT DOCUMENTS 3,503,474 A * 3/1970 August .................. 188/321.11
5,730,262 A * 3/1998 Rucks et al. ........... 188/321.11
5,794,742 A * 8/1998 Lack et al. ............. 188/321.11
5,984,061 A * 11/1999 Lack et al. ............. 188/321.11
6,155,545 A * 12/2000 Noro et al. ............. 188/322.16

FOREIGN PATENT DOCUMENTS

DE        19508851 A1 *   9/1996
GB         2211269 A  *   6/1989

OTHER PUBLICATIONS

Japanese Patent Application Laid-open HEI 11-173367.

* cited by examiner

*Primary Examiner*—Melanie Torres
(74) *Attorney, Agent, or Firm*—Orum & Roth LLC (57) ABSTRACT

In a hydraulic shock absorber for a vehicle, an annular support member is provided in a lower side of a portion to which a vehicle body side mounting member of a piston rod is fixed. A case cover is detachably provided around the vehicle body side mounting member and the annular support member. The case cover has a mounting portion which covers an outer shape of the vehicle body side mounting member. A tubular portion covers an outer periphery of the annular support member and extends to a lower side in an axial direction than the annular support member.

20 Claims, 6 Drawing Sheets

HYDRAULIC SHOCK ABSORBER FOR VEHICLE

BACKGROUND OF THE INVENTION

1. Field of the Invention

The present invention relates to a hydraulic shock absorber for a vehicle.

2. Description of the Related Art

In a hydraulic shock absorber in a rear wheel side of a motor cycle or the like, there is a structure in which a suspension spring is provided between a cylinder in a wheel side and a piston rod in a vehicle body side. An annular mounting member is fixed to an upper end portion of the piston rod. A mounting hole to the vehicle body side is provided in the annular mounting member. A tubular cover covering a periphery of the cylinder and the suspension spring is provided, as described in Japanese Patent Application Laid-open No. 11-173367 (JP-A).

In the hydraulic shock absorber as described in JP-A 11-173367, when beauty in outward appearance is required, it is necessary to change shapes and surface treatments of a plurality of parts. The annular mounting member may be formed in the upper end portion of the piston rod in a particular shape by an aluminum metal. An outer peripheral buff and a clear paint may be applied. The tubular cover may be formed in a particular shape. Chrome plating and the like may be applied, so that complication and high cost may result.

SUMMARY OF THE INVENTION

An object of the present invention is to easily accommodate a requirement of an aesthetically pleasing outer appearance, in a hydraulic shock absorber for a vehicle.

In accordance with the present invention, there is provided a hydraulic shock absorber for a vehicle in which a suspension spring is provided between a cylinder in a wheel side and a piston rod in a vehicle body side. A vehicle body side mounting member is fixed to an upper end portion of the piston rod, and a mounting hole to the vehicle body side is provided in the vehicle body side mounting member. An annular support member is provided in a lower side of a part to which the vehicle body side mounting member of the piston rod is fixed. A case cover is detachably provided around the vehicle body side mounting member and the annular support member. The case cover has a mounting portion which covers an outer shape of the vehicle body side mounting member and is provided with an opening hole aligning with the mounting hole of the vehicle body side mounting member. A tubular portion which is integrally connected to a lower end of the mounting portion via a step portion, is supported to the annular support member to cover an outer periphery of the annular support member, and extends to a lower side in an axial direction than the annular support member.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 6A and 6B show a case cover, in which

DESCRIPTION OF THE PREFERRED EMBODIMENTS

Figure 1:
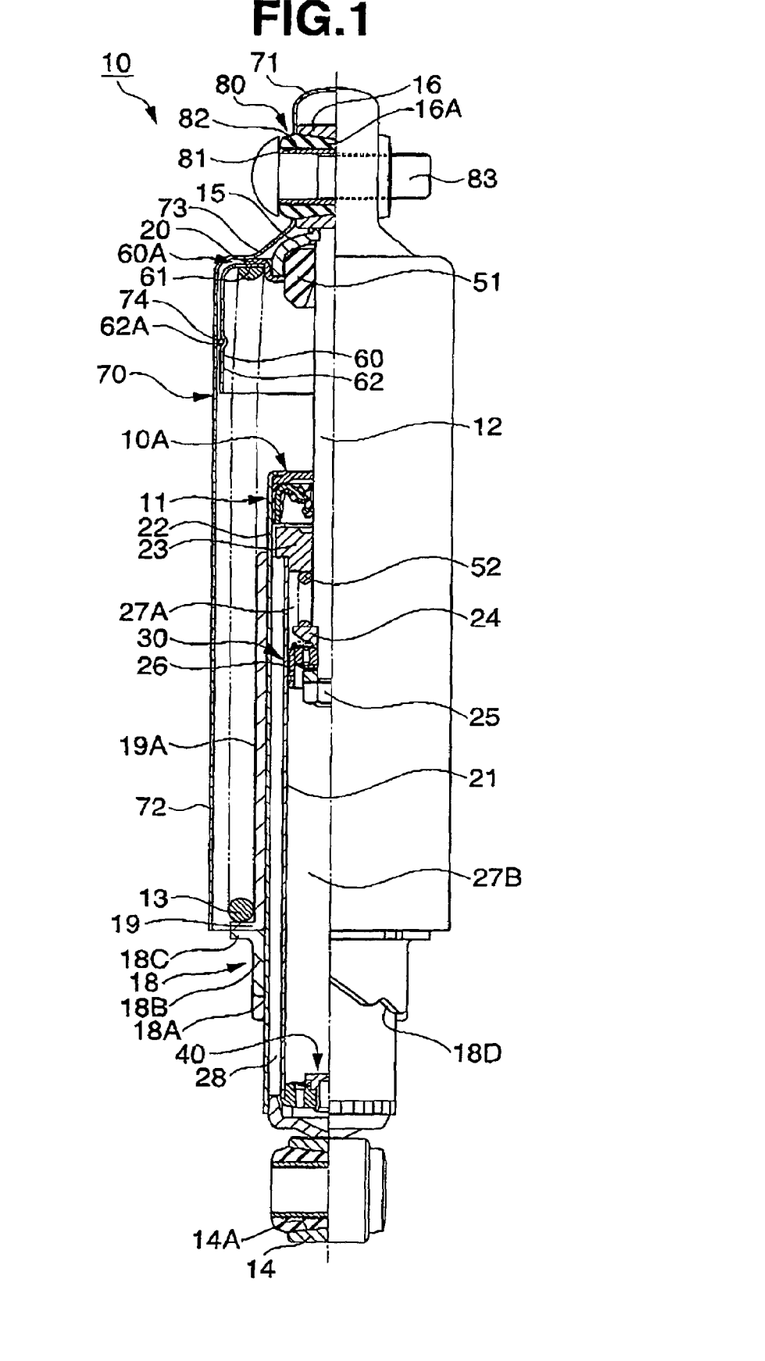
FIG. 1 is a cross sectional view showing a hydraulic shock absorber.

A hydraulic shock absorber 10 constitutes a rear wheel side suspension apparatus of a motor cycle or the like, and comprises, as shown in FIG. 1, a case cover 70 attached to a hydraulic shock absorber assembly 10A of a standard grade. A description will be given below of (A) a structure of the hydraulic shock absorber assembly 10A, and (B) an attached structure of the case cover 70.

Figure 2:
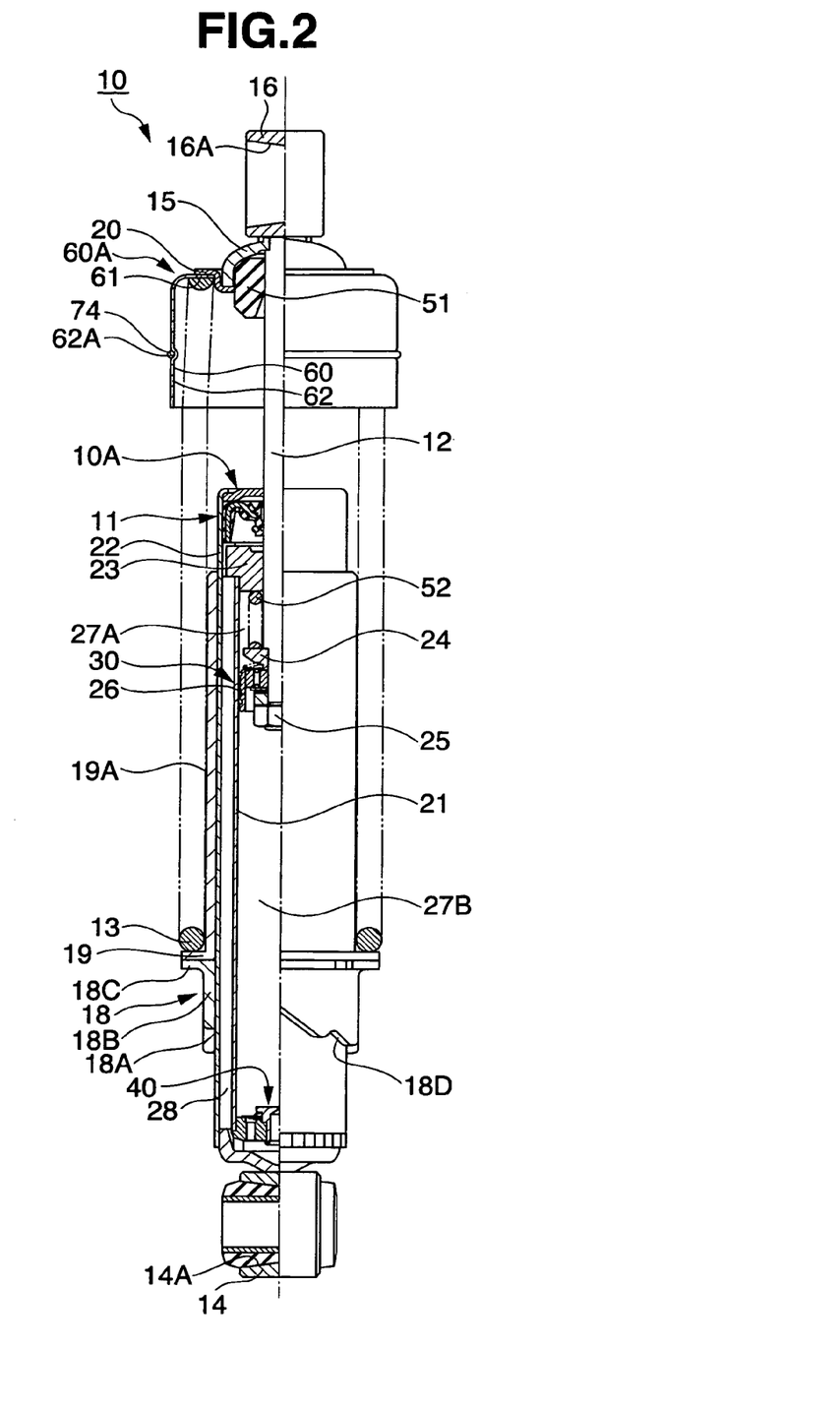
FIG. 2 is a cross sectional view showing a hydraulic shock absorber assembly of a standard grade.
Figure 3:
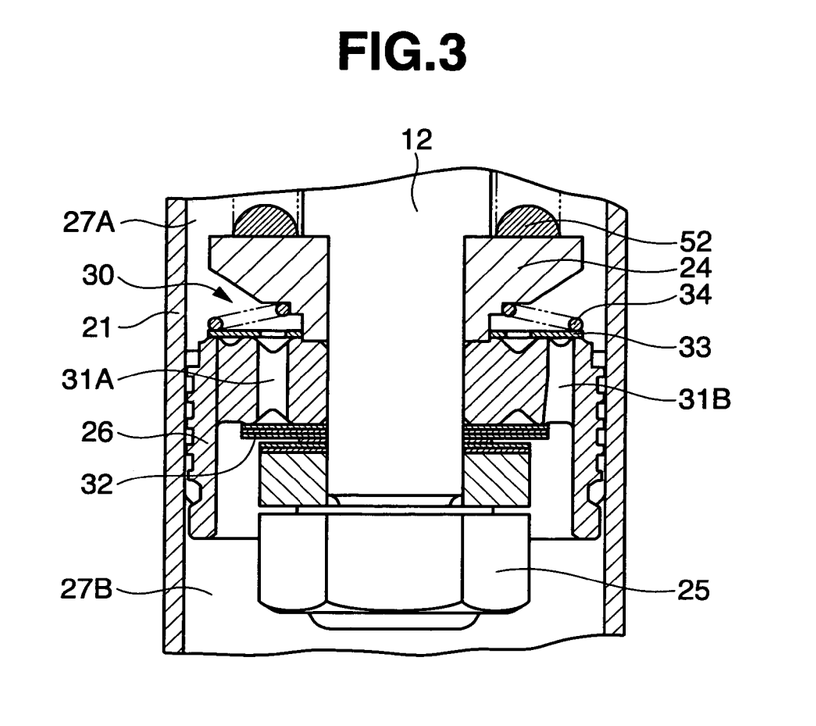
FIG. 3 is a cross sectional view showing a piston valve apparatus.
Figure 4:
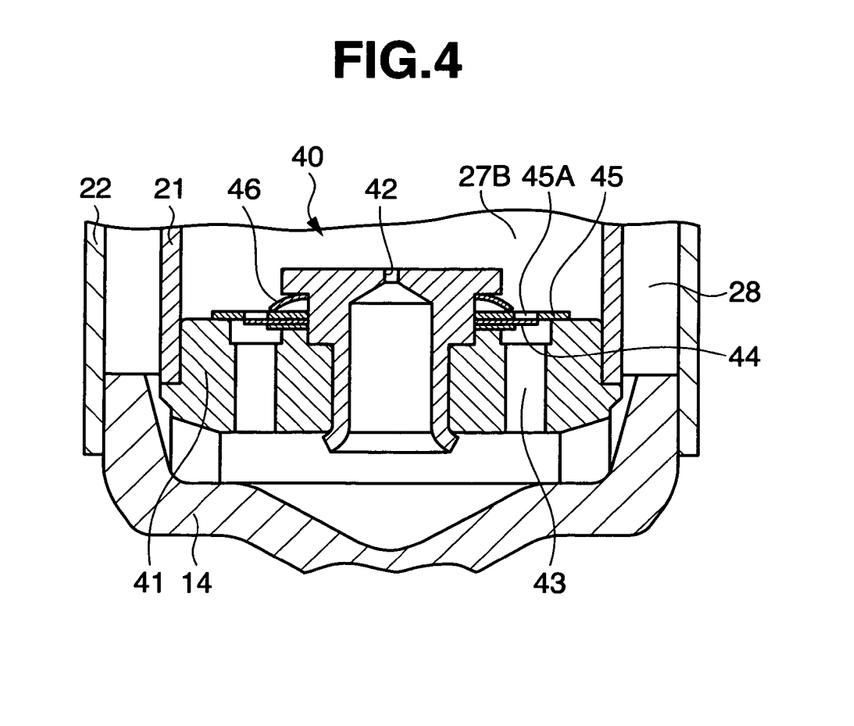
FIG. 4 is a cross sectional view showing a bottom valve apparatus.

(A) Structure of Hydraulic Shock Absorber Assembly 10A (FIGS. 2 to 4)

The hydraulic shock absorber assembly 10A comprises, as shown in FIG. 2, a piston rod 12 in a vehicle body side inserted to a damper cylinder 11 in a wheel side, and a suspension spring 13 interposed between the damper cylinder 11 and the piston rod 12.

An annular wheel side mounting member 14 is fixed to a lower end portion of the damper cylinder 11 in accordance with a welding process. The wheel side mounting member 14 is provided with a mounting hole 14A to the wheel side. An annular vehicle body side mounting member 16 is fixed to an upper end portion of the piston rod 12 via a binding cap 15 for a pressure side end shock absorbing rubber 51 mentioned below in accordance with a welding process. The vehicle body side mounting member 16 is provided with a mounting hole 16A to the vehicle body side.

A spring receiver 19 supported by a spring load adjusting apparatus 18 is equipped in an outer peripheral portion of the damper cylinder 11. A spring receiver 20 supported by the binding cap 15 is equipped in the piston rod 12, and the suspension spring 13 is interposed between the spring receiver 19 and the spring receiver 20. It is possible to adjust a set length (a spring load) of the suspension spring 13 by vertically moving the spring receiver 19 in an axial direction by means of the spring load adjusting apparatus 18. A spring force of the suspension spring 13 absorbs an impact force which is applied to the vehicle from a road surface.

In this case, the spring load adjusting apparatus 18 has engagement elements 18A which are respectively fixed to two positions in a diametrical direction of a lower end portion in an outer periphery of the damper cylinder 11. An adjuster 18B is rotatably fitted to an outer periphery of the damper cylinder 11. The adjuster 18B is vertically moved in an axial direction by turning the adjuster 18B by means of a tool engaged with an outer peripheral collar portion 18C of the adjuster 18B and engaging a plurality of step-shaped cam surfaces 18D provided in a lower end surface of the adjuster 18B with the engagement elements 18A in sequence. The spring receiver 19 supported to the outer peripheral collar portion 18C of the adjuster 18B and is vertically moved in an axial direction.

Further, the spring receiver 19 is provided with a cylindrical spring guide 19A rising up along an outer periphery of the damper cylinder 11.

The hydraulic shock absorber assembly 10A comprises the damper cylinder 11 formed as a double tube constituted by an inner cylinder 21 and an outer cylinder 22. The piston rod 12 is inserted through a rod guide 23 fixed to opening ends of the inner cylinder 21 and the outer cylinder 22 to be supported. A piston 26 fixed by a piston stopper 24 and a nut 25 is provided in an insertion end of the piston rod 12 to the inner cylinder 21. The hydraulic shock absorber assembly 10A comprises a piston rod side oil chamber 27A and a piston side oil chamber 27B sectioned by the piston 26 formed in an inner portion of the inner cylinder 21. An oil reservoir chamber 28 is formed in an annular gap between the inner cylinder 21 and the outer cylinder 22. A working fluid is filled in the oil chambers 27A and 27B and the oil reservoir chamber 28.

The hydraulic shock absorber assembly 10A, being provided with a piston valve apparatus 30 in the piston 26, can communicate the piston rod side oil chamber 27A and the piston side oil chamber 27B by the piston valve apparatus 30, forming an expansion side damping force generating apparatus. Further, the hydraulic shock absorber assembly 10A, being provided with a bottom valve apparatus 40 in a bottom portion side of the inner cylinder 21, can communicate the piston side oil chamber 27B and the oil reservoir chamber 28 by the bottom valve apparatus 40, forming a compression side damping force generating apparatus. The hydraulic shock absorber assembly 10A controls stretching vibration of the damper cylinder 11 and the piston rod 12 involved in absorption of the impact force by the suspension spring 13. This function is accomplished by the expansion side damping force generating apparatus constituted by the piston valve apparatus 30 and the compression side damping force generating apparatus, itself comprising the bottom valve apparatus 40.

The piston valve apparatus 30 comprises, as shown in FIG. 3, an expansion side oil passage 31A and a compression side oil passage 31B communicating the oil chamber 27A and the oil chamber 27B pieced in the piston 26. An expansion side disc valve 32 is provided in the expansion side oil passage 31A. A compression side check valve 33 and a valve spring 34 are provided in the compression side oil passage 31B. An expansion side damping force is generated by deflecting the expansion side disc valve 32 on the basis of a hydraulic pressure of the oil chamber 27A to push open during expansion. The compression side check valve 33 is opened on the basis of a hydraulic pressure of the oil chamber 27B during compression.

The bottom valve apparatus 40 comprises, as shown in FIG. 4, a bottom piece 41 arranged in a bottom portion of the inner cylinder 21 provided with an orifice hole 42 and an oil passage 43 communicating the oil chamber 27B and the oil reservoir chamber 28. The oil passage 43 is provided with a compression side disc valve 44, an expansion side check valve 45 and a valve spring 46. The expansion side check valve 45 covers the compression side disc valve 44 and the oil passage 43 from a side of the oil chamber 27B, and closes an oil hole 45A of the expansion side check valve 45 by the compression side disc valve 44. A compression side damping force originating from a throttle resistance of the orifice hole 42 is generated. The compression side damping force is generated by deflecting the compression side disc valve 44 via the hydraulic pressure of the oil chamber 27B to push open during compression, and the expansion side check valve 45 is opened as a result of a negative pressure in the oil chamber 27B during expansion.

In this case, the hydraulic shock absorber assembly 10A is provided with a compression side shock absorbing rubber 51 which buffers an impact force during maximum compression, and controls a maximum compression stroke. And the hydraulic shock absorber assembly 10A is also provided with an expansion side shock absorbing spring 52 which buffers an impact force during maximum expansion, and controls the maximum expansion stroke.

The hydraulic shock absorber assembly 10A clamps a mounting portion 61 of a tubular spring cover 60 between the spring receiver 20 provided in the piston rod 12 and the suspension spring 13, and covers an outer periphery of the suspension spring 13 with a cylindrical portion 62 of the spring cover 60.

(B) Attached Structure of Case Cover 70

Figure 5:
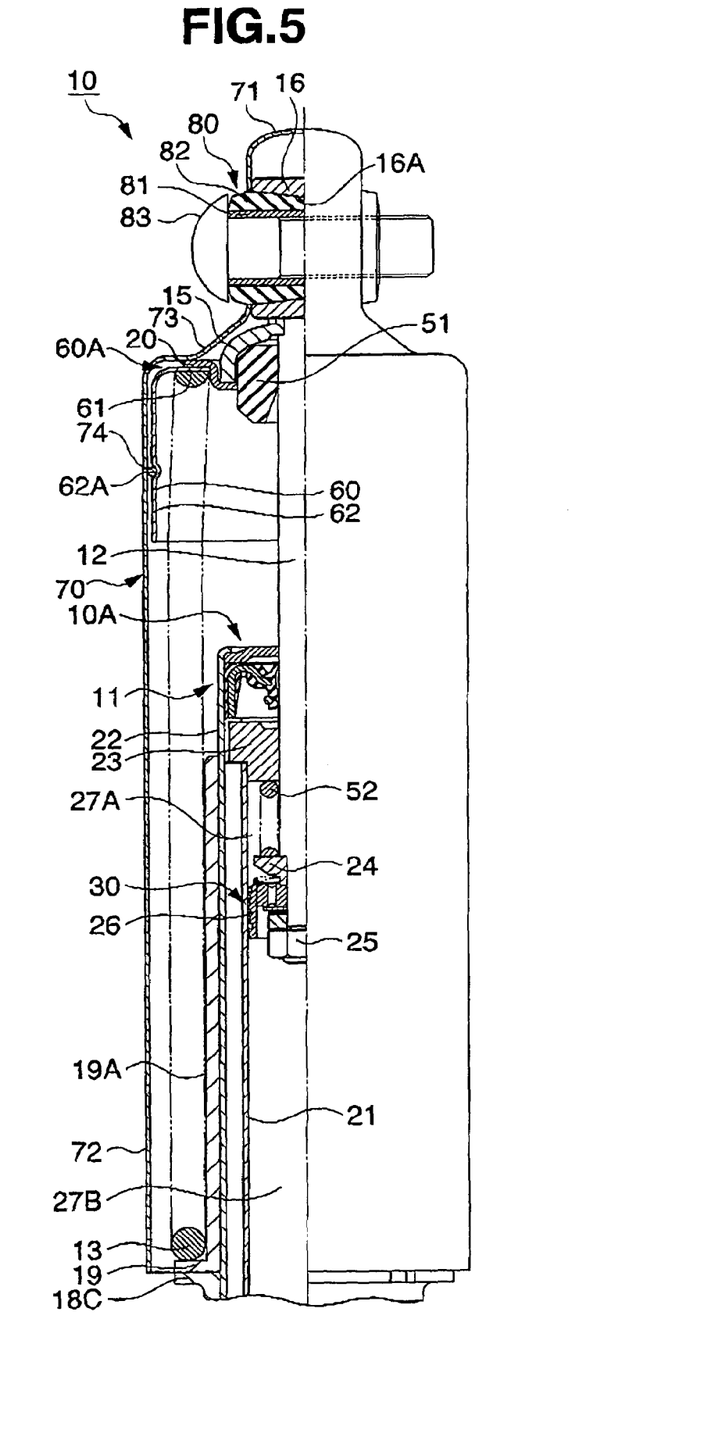
FIG. 5 is an enlarged view of a main portion in FIG. 1.
Figure 7:
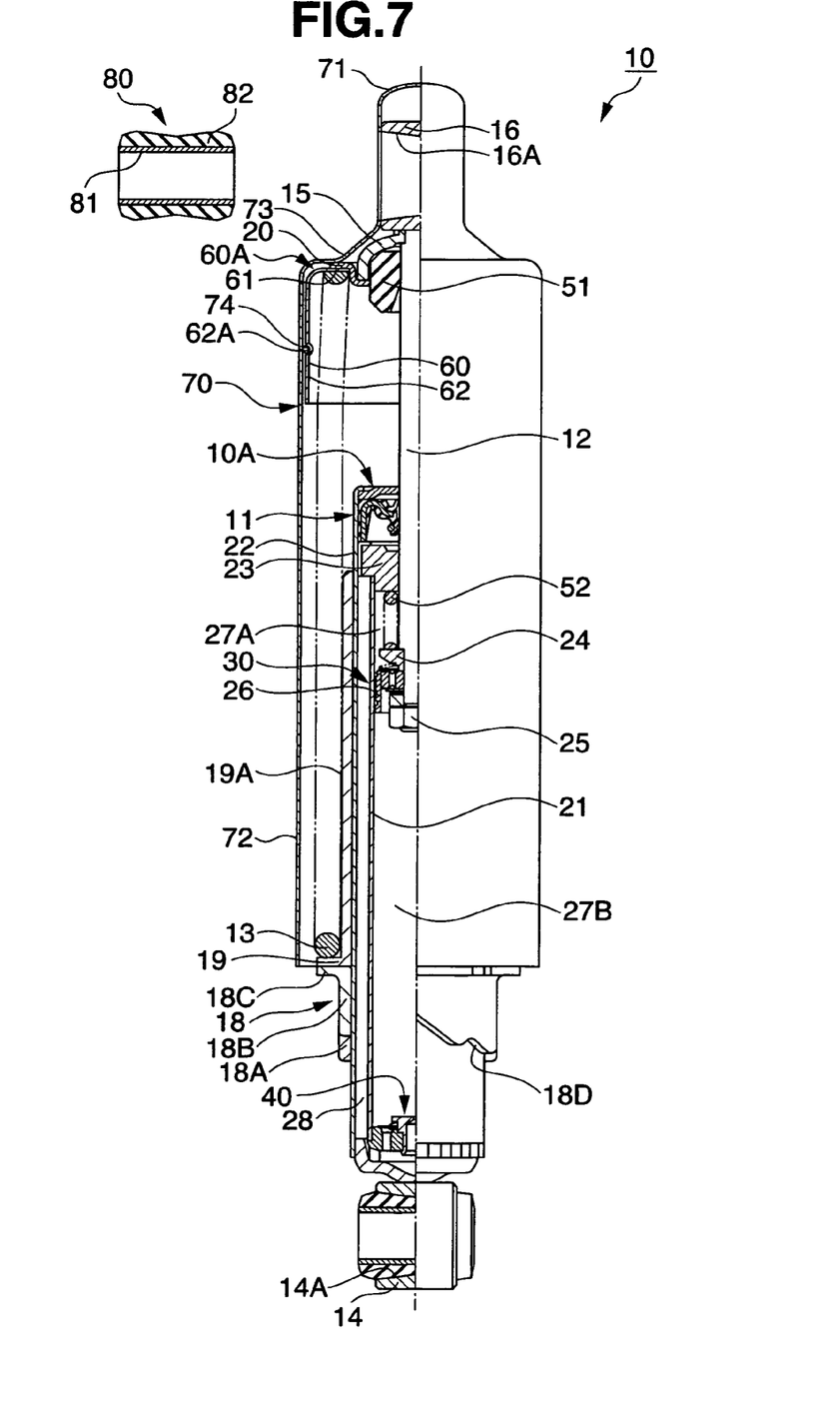
FIG. 7 is a cross sectional view showing a vehicle body side mounting member and a collar of the hydraulic shock absorber in a separate manner.

The hydraulic shock absorber 10 comprises, as shown in FIGS. 1, 5 and 7, an annular support member 60A for the case cover 70 formed by the spring receiver 20 provided in a lower side of a portion to which the vehicle body side mounting member 16 corresponding to the annular mounting member of the piston rod 12 in the hydraulic shock absorber assembly 10A is fixed, and the spring cover 60. The case cover 70 is detachably provided around the vehicle body side mounting member 16 and the annular support member 60A (the spring receiver 20 and the spring cover 60).

Figure 6A:
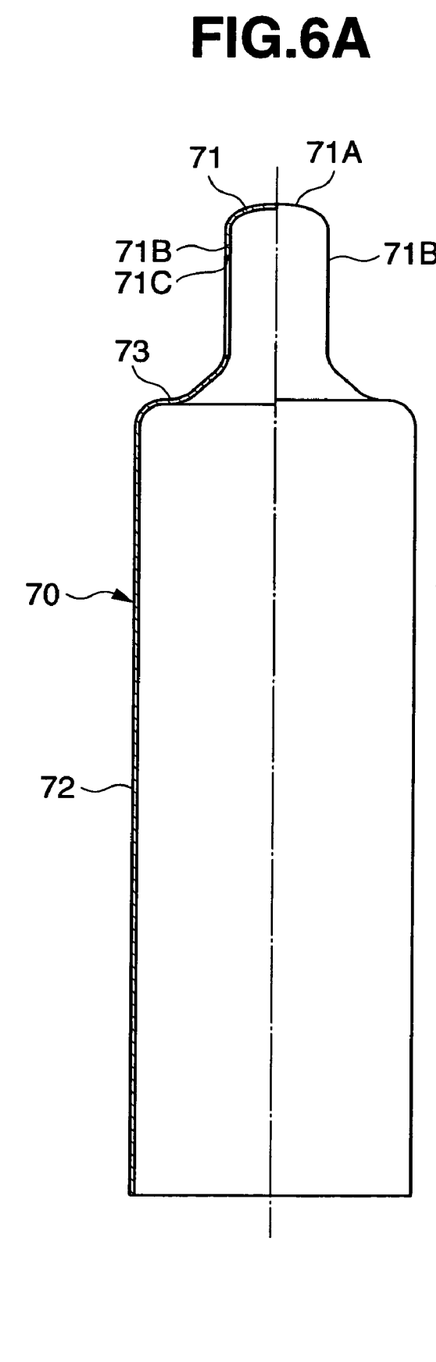
FIG. 6A is a front elevational view and FIG. 6B is a side elevational view.
Figure 6B:
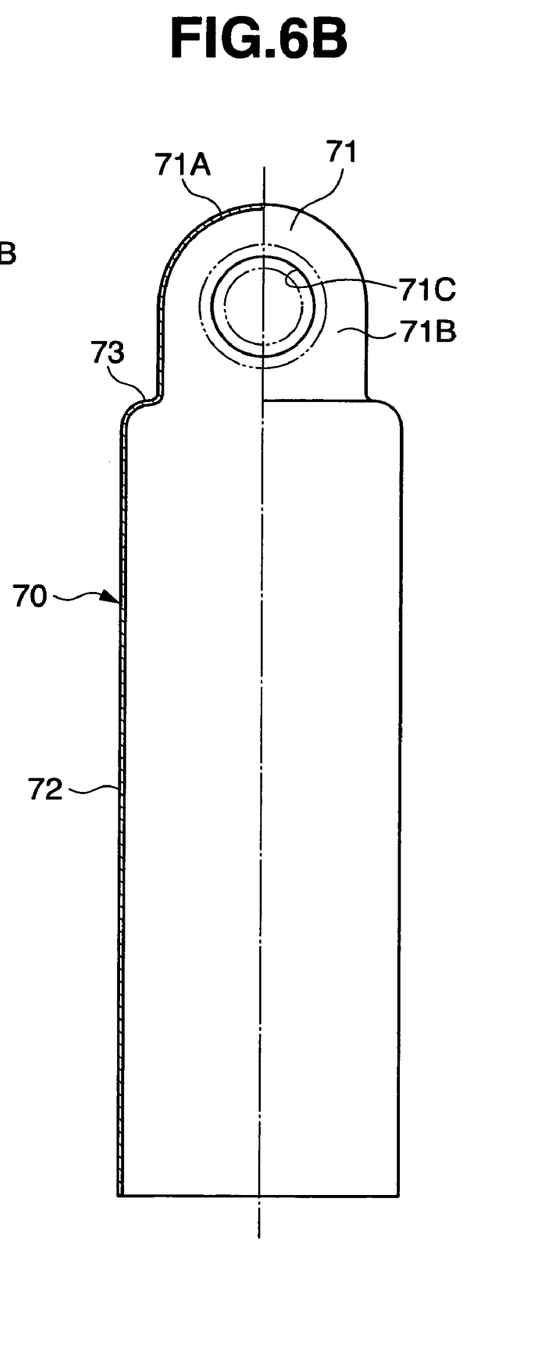

The case cover 70 has a mounting portion 71 and a tubular portion 72, as shown in FIGS. 6A and 6B. The mounting portion 71 covers an outer shape of the vehicle body side mounting member 16 via a space around the outer shape of the vehicle body side mounting member 16. The mounting portion 71 is provided with an opening hole 71C which is aligned with the mounting hole 16A of the vehicle body side mounting member 16 with approximately the same diameter as the mounting hole 16A. The tubular portion 72 is integrally connected to a lower end of the mounting portion 71 via a shoulder-shaped step portion 73. The tubular portion 72 is supported by the annular support member 60A so as to cover an outer periphery of the annular support member 60A (the spring receiver 20 and the spring cover 60), and extends to a lower side in an axial direction with respect to the annular support member 60A. The case cover 70 comprises the step portion 73 mounted and supported to the spring receiver 20 of the annular support member 60A in an axial direction. The tubular portion 72 is supported to the outer periphery of the spring cover 60 in a diametrical direction. In a free state of the hydraulic shock absorber 10, a lower end of the tubular portion 72 extends to a position covering a lower end portion of the suspension spring 13.

In this case, the mounting portion 71 of the case cover 70 has a U-shaped surface portion 71A surrounding an annular (a semicircular arc shaped) outer periphery of the vehicle body side mounting member 16. Flat portions 71B and 71B are disposed in both sides of the U-shaped surface portion 71A and extend along both side surfaces to which the mounting hole 16A of the vehicle body side mounting member 16 are open. The opening hole 71C mentioned above is provided in both side flat portions 71B.

The case cover 70 comprises a press molded product of a metal material such as a steel plate or the like, or a molded product of a synthetic resin. The case cover 70 can be changed in its outer appearance and design by selecting and applying an appropriate plating, coating color or the like.

The case cover 70 can interpose an annular elastic member 74 such as a rubber ring or the like with respect to the annular support member 60A (the spring cover 60). The annular elastic member 74 in accordance with the present embodiment comprises an inner peripheral portion engaged with and attached to an annular groove 62A formed in a convex shape in the outer periphery of the cylindrical portion 62 of the spring cover 60. An outer peripheral portion is brought into contact with an inner periphery of the tubular portion 72 of the case cover 70.

The hydraulic shock absorber 10 comprises a collar 80 inserted to the mounting hole 16A of the vehicle body side mounting member 16 via the opening hole 71C of the mounting portion 71 where the mounting portion 71 of the case cover 70 is attached to the vehicle body side mounting member 16. As shown in FIG. 7, the collar 80 comprises, as shown in FIG. 7, an elastic body 82 such as rubber or the like attached to an outer periphery of a metal ring 81. The elastic body 82 independent from the metal ring 81 may be fitted and attached to an outer periphery of the metal ring 81. The elastic body 82 may also be integrally formed in an outer periphery of the metal ring 81 in accordance with a baking process. Accordingly, the elastic body 82 of the collar 80 can be arranged in a protruding manner in an outer side of the opening holes 71C in both sides of the mounting portion 71. An opening edge of the opening hole 71C of the mounting portion 71 can be locked to the elastic body 82 of the collar 80. A mounting bolt 83 for the vehicle body is inserted and attached to the collar 80. In this case, the hydraulic shock absorber 10 comprises the collar 80 inserted to the mounting hole 14A of the wheel side mounting member 14 (FIG. 1).

In accordance with the present embodiment, the following operations and effects can be achieved.

(a) Since the case cover 70 is attachable to and detachable from the vehicle body side mounting member 16 or the like while employing the vehicle body side mounting member 16 or the like of a standard specification to which no particular aesthetic outer appearance is applied, it is possible to rapidly and easily respond to various aesthetic requirements regarding outer appearance of the hydraulic shock absorber 10 only by changing the aesthetic treatment such as the shape of the case cover 70, the plating, the coating color and the like.

(b) Since the mounting portion 71 of the case cover 70 has the U-shaped surface portion 71A and both side flat portions 71B, it is possible to attach the case cover 70 to the vehicle body side mounting member 16 with no play. It is possible to improve freedom in the shape of the U-shaped surface portion 71A by arranging the space between the U-shaped surface portion 71A and the annular outer periphery of the vehicle body side mounting member 16.

(c) Since the annular elastic member 74 is interposed between the case cover 70 and the annular support member 60A, it is easy to achieve centering for mounting the case cover 70 even where the case cover 70 and the annular support member 60A are formed by the press molded product of the steel plate or the like. It is possible to absorb the vibration of the case cover 70 and the annular support member 60A to achieve vibration control. It is also possible to prevent the case cover 70 and the annular support member 60A from being in contact with each other to generate a foreign noise.

(d) Since the case cover 70 is locked to the elastic body 82 in the outer periphery of the collar 80 inserted to the mounting hole 16A of the vehicle body side mounting member 16, it is possible to position the case cover 70 in the axial direction. It is possible to prevent the case cover 70 from coming off at an upper side and it is possible to prevent the case cover 70 from turning in a circumferential direction.

Further, it is possible to prevent a foreign noise from being generated due to contact between the case cover 70 and the vehicle body side mounting member 16 made of metal material or the like.

(e) The tubular cover 60 such as a spring cover or a dust cover of a standard grade can be employed as the annular support member 60A. Accordingly, it is possible to use the hydraulic shock absorber assembly 10A to which the tubular cover 60 of the standard grade is attached as it is, and it is possible to change the outward aesthetic appearance at a low cost.

As heretofore explained, embodiments of the present invention have been described in detail with reference to the drawings.

However, the specific configurations of the present invention are not limited to the illustrated embodiments but those having a modification of the design within the range of the presently claimed invention are also included in the present invention. For example, the annular support member 60A detachably supporting the case cover 70 in accordance with the present invention may be structured such that the spring receiver 20 and the tubular cover 60 such as the spring cover 60 or the like are integrally formed, or may be arranged as a thick washer-shaped annular body without being limited by the tubular cover.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A hydraulic shock absorber for a vehicle having a suspension spring provided between a cylinder in a wheel side and a piston rod in a vehicle body side, comprising:
   a vehicle body side mounting member fixed to an upper end portion of the piston rod, having a mounting hole with respect to the vehicle body side provided in the vehicle body side mounting member,
   an annular support member provided in a lower side of a part to which the vehicle body side mounting member of the piston rod is fixed,
   a unitary case cover detachably provided around the vehicle body side mounting member and the annular support member, and
   the case cover having a mounting portion which extends to cover the whole portion of an outer shape of the vehicle body side mounting member including its top and being provided with an opening hole aligning with the mounting hole of the vehicle body side mounting member, and a tubular portion which is integrally connected to a lower end of the mounting portion via a step portion supportable by the annular support member so as to cover an outer periphery of the annular support member, and extendable to a lower side in an axial direction from the annular support member.

2. A hydraulic shock absorber for a vehicle as claimed in claim 1, wherein the mounting portion of the case cover has a U-shaped surface portion surrounding an annular outer periphery of the vehicle body side mounting member, both side flat portions extending along both side surfaces to which the mounting hole of the vehicle body side mounting member is open, the opening hole being provided in both side flat portions.

3. A hydraulic shock absorber for a vehicle as claimed in claim 1, wherein the case cover and the annular support member comprise a metal material, and an annular elastic member is interposed between the case cover and the annular support member.

4. A hydraulic shock absorber for a vehicle as claimed in claim 2, wherein the case cover and the annular support member comprise a metal material, and an annular elastic member is interposed between the case cover and the annular support member.

5. A hydraulic shock absorber for a vehicle as claimed in claim 1, wherein a collar is inserted to the mounting hole of the vehicle body side mounting member via the opening hole of the case cover, and the case cover is locked to an elastic body in an outer periphery of the collar.

6. A hydraulic shock absorber for a vehicle as claimed in claim 2, wherein a collar is inserted to the mounting hole of the vehicle body side mounting member via the opening hole of the case cover, and the case cover is locked to an elastic body in an outer periphery of the collar.

7. A hydraulic shock absorber for a vehicle as claimed in claim 3, wherein a collar is inserted to the mounting hole of the vehicle body side mounting member via the opening hole of the case cover, and the case cover is locked to an elastic body in an outer periphery of the collar.

8. A hydraulic shock absorber for a vehicle as claimed in claim 4, wherein a collar is inserted to the mounting hole of the vehicle body side mounting member via the opening hole of the case cover, and the case cover is locked to an elastic body in an outer periphery of the collar.

9. A hydraulic shock absorber for a vehicle as claimed in claim 1, wherein the annular support member is a tubular cover.

10. A hydraulic shock absorber for a vehicle as claimed in claim 2, wherein the annular support member is a tubular cover.

11. A hydraulic shock absorber for a vehicle as claimed in claim 3, wherein the annular support member is a tubular cover.

12. A hydraulic shock absorber for a vehicle as claimed in claim 4, wherein the annular support member is a tubular cover.

13. A hydraulic shock absorber for a vehicle as claimed in claim 1, wherein the annular support member comprises a spring receiver for a suspension spring provided in a lower side of a portion in which the vehicle body side mounting member is fixed to the piston rod, and a spring cover, and
the mounting portion of the spring cover is clamped between the spring receiver and the suspension spring.

14. A hydraulic shock absorber for a vehicle as claimed in claim 1, wherein the annular support member comprises a spring receiver for a suspension spring provided in a lower side of a portion in which the vehicle body side mounting member is fixed to the piston rod, and a spring cover, and
the spring receiver and the spring cover are integrally structured.

15. A hydraulic shock absorber for a vehicle as claimed in claim 13, wherein the case cover is supported such that the step portion is mounted to the spring receiver of the annular support member in the axial direction.

16. A hydraulic shock absorber for a vehicle as claimed in claim 5, wherein the collar comprises a metal ring and an elastic body provided in an outer periphery of the metal ring, the metal ring and the elastic body being independently formed and the elastic body being fitted and attached to the outer periphery of the metal ring.

17. A hydraulic shock absorber for a vehicle as claimed in claim 6, wherein the collar comprises a metal ring and an elastic body provided in an outer periphery of the metal ring, the metal ring and the elastic body being independently formed and the elastic body being fitted and attached to the outer periphery of the metal ring.

18. A hydraulic shock absorber for a vehicle as claimed in claim 5, wherein the collar comprises a metal ring and an elastic body provided in an outer periphery of the metal ring, said collar being integrally formed by baking the elastic body on the outer periphery of the metal ring.

19. A hydraulic shock absorber for a vehicle as claimed in claim 6, wherein the collar comprises a metal ring and an elastic body provided in an outer periphery of the metal ring, said collar being integrally formed by baking the elastic body on the outer periphery of the metal ring.

20. A hydraulic shock absorber for a vehicle as claimed in claim 1, wherein the elastic support member is a washer-shaped elastic body.

* * * * *